(12) United States Patent
Salvati et al.

(10) Patent No.: US 7,552,848 B2
(45) Date of Patent: Jun. 30, 2009

(54) AUTOMATIC DOSING DEVICE WITH MOTOR OVERRUNNING ABSORBING MEANS

(75) Inventors: Biagio Salvati, Udine (IT); Derek Burke, Pordenone (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 419 days.

(21) Appl. No.: 11/103,955

(22) Filed: Apr. 12, 2005

(65) Prior Publication Data
US 2005/0230427 A1 Oct. 20, 2005

(30) Foreign Application Priority Data
Apr. 19, 2004 (EP) .................. 04101608

(51) Int. Cl.
*G01F 11/20* (2006.01)
(52) U.S. Cl. .................. 222/236; 222/412
(58) Field of Classification Search ........... 222/236, 222/241, 333, 413, 185, 1, 181.1, 240, 226, 222/235, 258, 261, 262, 263, 412, 625
See application file for complete search history.

(56) References Cited

U.S. PATENT DOCUMENTS

| 2,794,577 | A | * | 6/1957 | Van Leeuwen | 222/227 |
| 3,183,553 | A | * | 5/1965 | Slater | 198/550.1 |
| 3,307,748 | A | * | 3/1967 | Dunn, Jr. | 222/227 |
| 3,840,154 | A | * | 10/1974 | Speak | 222/181.2 |
| 5,110,015 | A | * | 5/1992 | Kilts | 222/413 |
| 5,263,572 | A | * | 11/1993 | Hove | 198/672 |
| 5,323,547 | A | * | 6/1994 | Kaiju et al. | 34/580 |
| 6,599,007 | B2 | * | 7/2003 | Ryoo et al. | 366/292 |
| 2004/0104251 | A1 | * | 6/2004 | Baumann | 222/413 |
| 2006/0071037 | A1 | * | 4/2006 | Pickrell | 222/413 |

FOREIGN PATENT DOCUMENTS

| GB | 1 427 130 | 3/1976 |
| JP | 63 281697 | 11/1988 |
| WO | WO 03-023120 | 3/2003 |
| WO | 03/093561 | 11/2003 |
| WO | WO 03-093560 | 11/2003 |

OTHER PUBLICATIONS

Patent Abstracts of Japan, vol. 1997, No. 11, JP 09 183516, English Abstract.

* cited by examiner

*Primary Examiner*—Lien T Ngo
(74) *Attorney, Agent, or Firm*—Pearne & Gordon LLP

(57) ABSTRACT

The present invention refers to an automatic dosing device having motor overrunning absorbing means (36).

The automatic dosing device according to the invention comprises a dosing screw (2), guiding means (20), a cursor (24), and a movable sealing member (30). The automatic dosing device is characterized by further comprising overrunning absorbing means (36) configured to be operable for preventing a force acting on the cursor (24) and exceeding a predetermined intensity to be transferred to the sealing member (30) independently of the sealing member position.

14 Claims, 5 Drawing Sheets

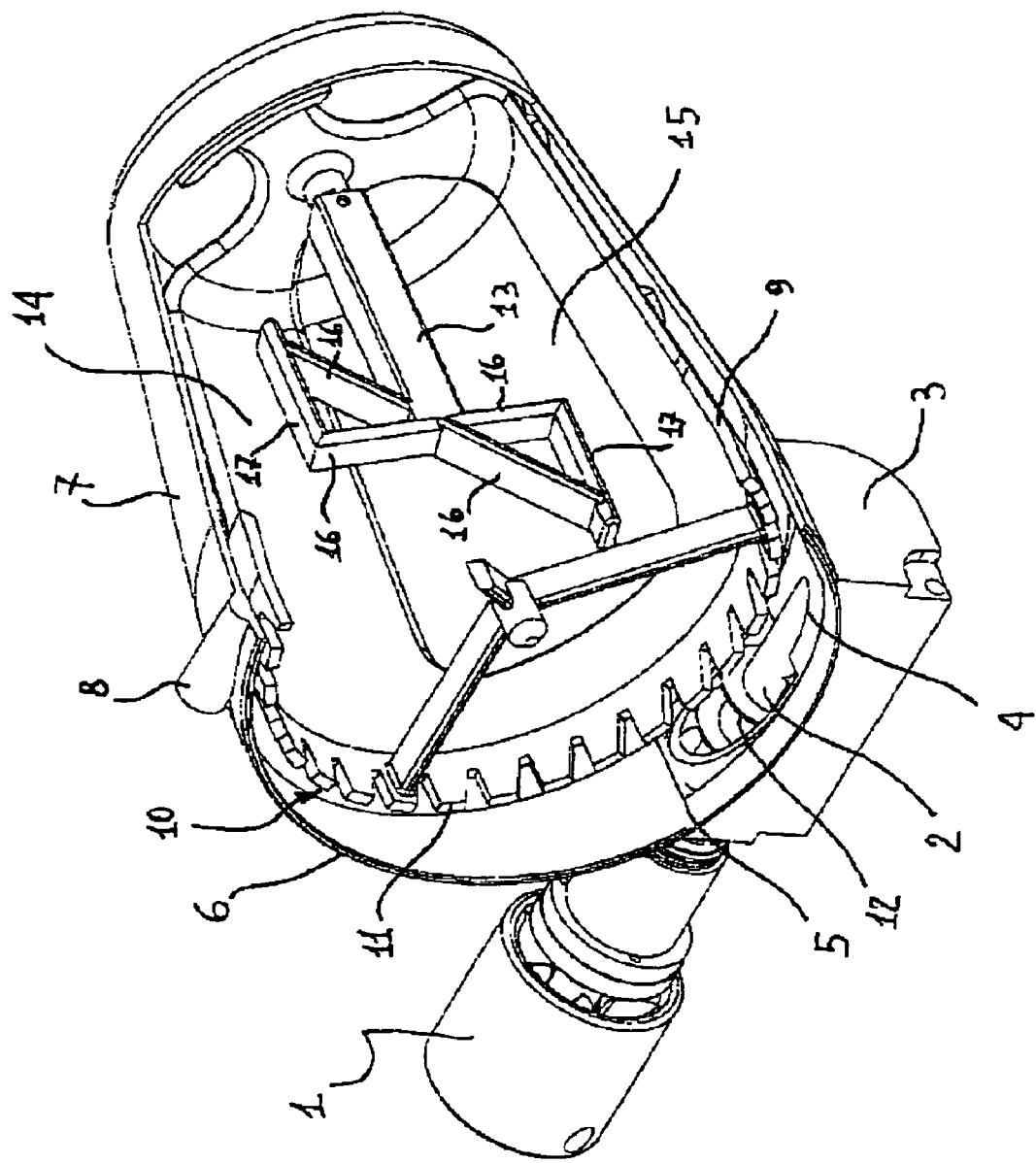
Fig: 1

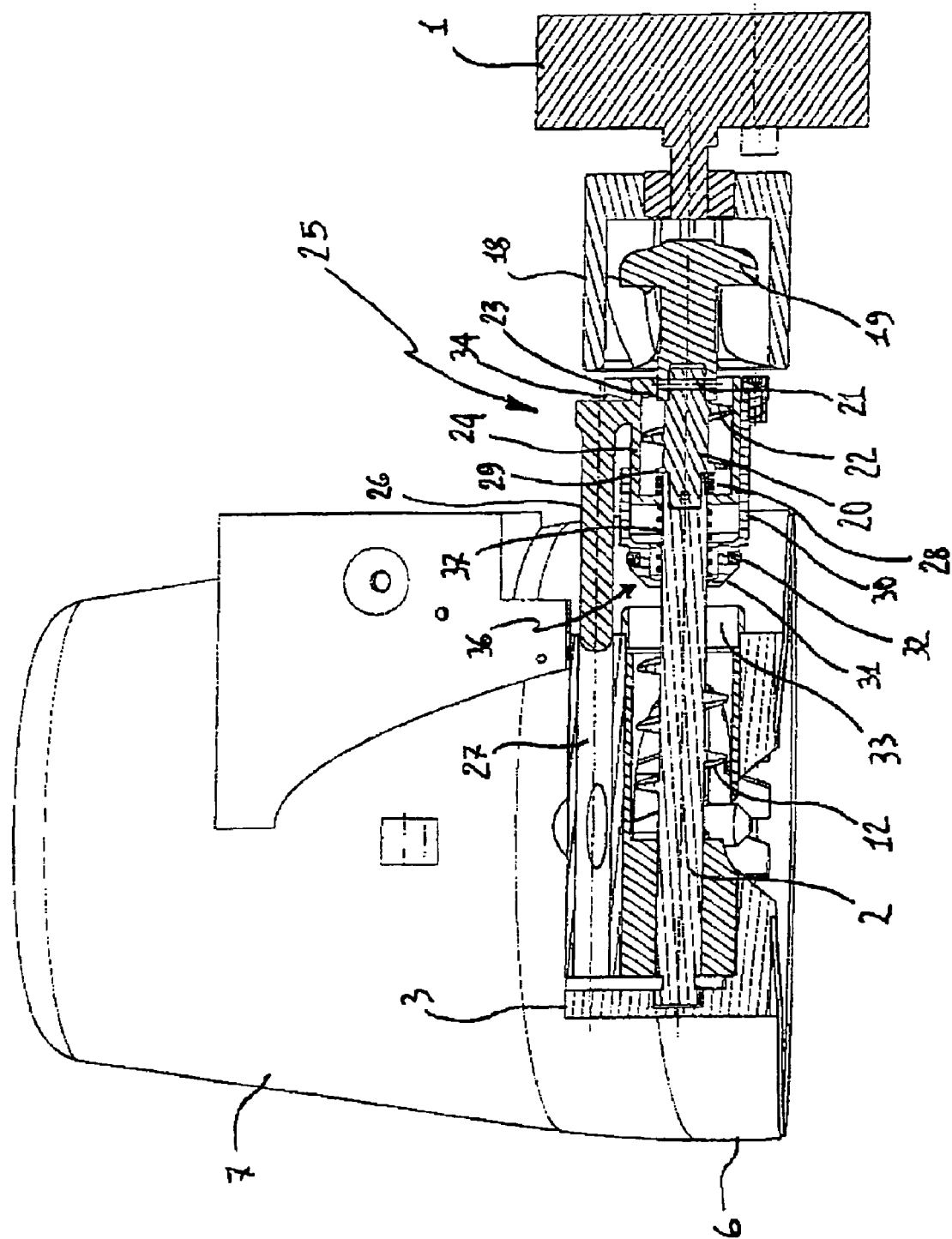
Fig: 2

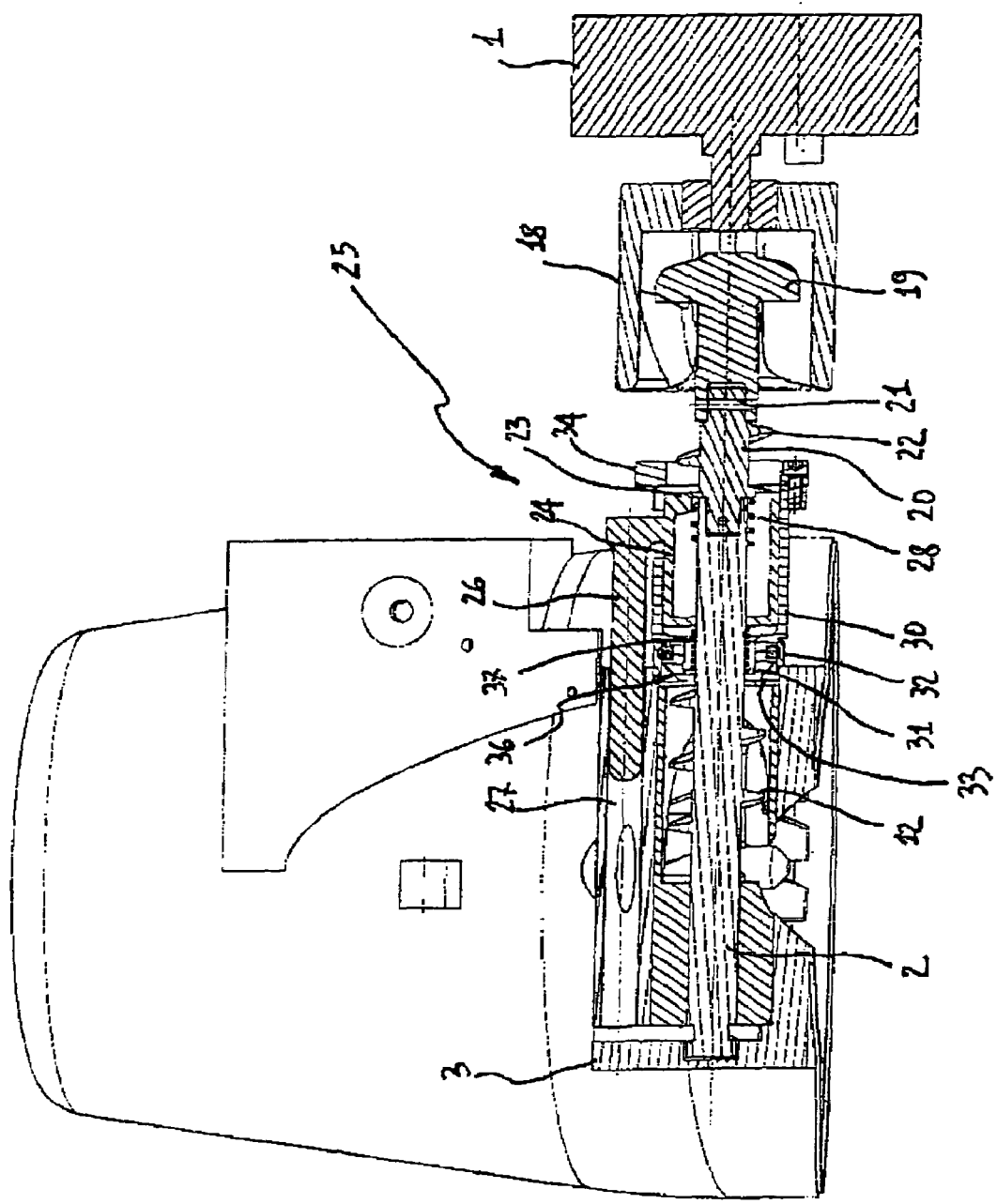
Fig: 3

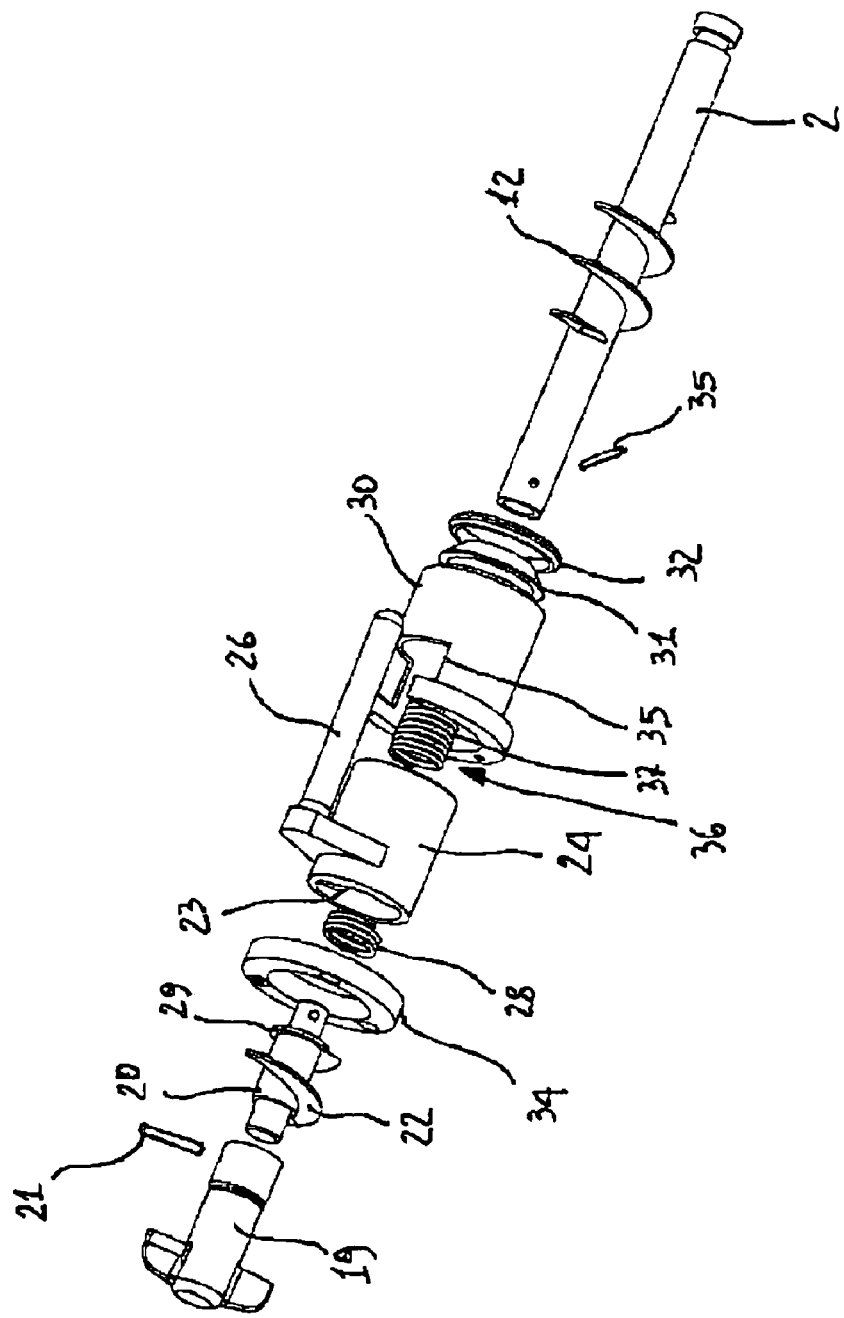
Fig: 4

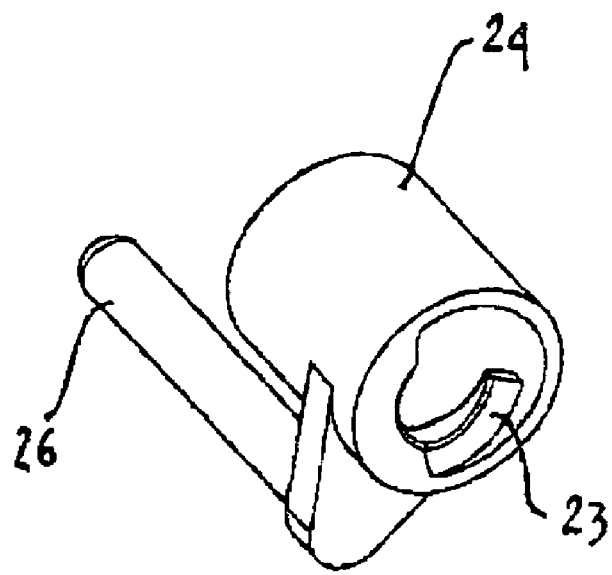
Fig: 5

AUTOMATIC DOSING DEVICE WITH MOTOR OVERRUNNING ABSORBING MEANS

The present invention refers to an automatic dosing device having motor overrunning absorbing means.

Automatic dosing devices are widely used in many kinds of appliances such as washing machines, dishwashers, beverage dispensing machines, and all those machines in which it is necessary dosing stored material out of its storage.

Automatic dosing devices provided with a dosing screw able to control the dosing of stored material are known in the art. An example is disclosed in WO 03093561 wherein the screw unit comprises an attacher that interacts with the thread of the dosing screw, a closer that closes the outlet of the dosing unit and a directer that prevents the parts from rotating around the dosing screw.

The dosing screw disclosed in WO 03093561 is operated by an electric motor. When the closer has completed the closing operation of the dosing unit outlet, a micro-switch activates for turning off the electric motor in order to prevent the directer screw from damages caused by the overrunning of the motor. This solution has not been found to be effective because the lag between the instant in which the micro-switch is activated and the instant in which the motor is effectively stopped can be sufficient for breaking the screw, which is usually made of cheap material such as plastic, or for damaging the sealing because it is excessively pressed against said outlet.

Another drawback of the dosing screw disclosed in WO 03093561 is that the motor can overrun not only when the dosing unit outlet closure condition has been accomplished but also when the dosing screw is dosing a clogged substance and the outlet is not yet closed. In this situation clogged material can interfere with the closure of the dosing unit outlet, not allowing said closure to be completed. Since in this case the switch cannot be activated, the motor continues running thereby damaging the directer and the sealing because the latter is stressed against the clogged material.

Another drawback of the dosing screw described in the cited International Patent Application consists in that a motor overrun can occur even because of the ordinary wear of the parts in contact. In fact since the switch for turning off the electric motor is activated when the outlet closure condition has been reached, it is evident that after a number of working cycles, the backlash between mechanical parts can prevent said closure condition from being reached efficiently with a consequent failure of the switch activation.

A further drawback of the dosing screw described above consists in that a micro-switch requires appropriate electrical equipment to be installed. This results in a complication of the appliance electrical scheme wherein the dosing device is provided and in additional manufacturing and installation work for the producer. Furthermore the presence of electrical components limits the possibilities of washing the dosing device easily and in safe conditions.

The aim of the present invention is therefore to solve the noted problems, eliminating the drawbacks of the cited known art and thus providing an automatic dosing device which avoids the risk of breaking because of an overrun of the motor driving the dosing device.

A purpose of the present invention is to provide an automatic dosing device which can be used in wet environments and which can be easily washed under flushing water.

Another purpose of the present invention is to provide an automatic dosing device which avoids the formation of clogs within the substances to be dispensed.

A further purpose of the present invention is to provide an automatic dosing device which allows the use of high torque motors for driving the dosing device with no risk of damages for its components.

Another purpose of the present invention is to provide an automatic dosing device that can avoid motor overrun independently of the sealing member position.

Another purpose of the present invention is to provide an automatic dosing device of improved reliability, the same being simple to be manufactured and easy to be disassembled.

A further purpose of the present invention is to provide an automatic dosing device able to dispense liquid without losses.

Advantages, objects, and features of the invention will be set forth in part in the description which follows and in part will become apparent to those having ordinary skill in the art upon examination of the following or may be learned from practice of the invention. The objects and advantages of the invention may be realised and attained as particularly pointed out in the appended claims.

The accompanying drawings, which are included to provide a further understanding of the invention and are incorporated in and constitute a part of this specification, illustrate one of the possible embodiment of the invention and together with the description serve to explain the principles of the invention.

In the drawings:

FIG. 1 shows an isometric and partly sectioned view of the automatic dosing device according to the present invention;

FIG. 2 shows a sectional view of the automatic dosing device of FIG. 1 in its open position;

FIG. 3 shows a sectional view of the automatic dosing device of FIG. 1 in its closed position;

FIG. 4 shows an exploded view of the dosing screw unit according to the present invention;

FIG. 5 shows an isometric view of the cursor.

In FIG. 1 is shown an embodiment of the automatic dosing device according to the present invention wherein a motor 1 drives a dosing screw 2 housed in an housing 3. The housing 3 is provided with an aperture 4 facing a corresponding aperture 5 provided in a cover 6 that is shown without its ceiling and partly sectioned in FIG. 1. The cover 6 is pivotally associated to a storage chamber 7 by means of a hinge 8 and it closes a first open end of the chamber 7. The cover 6 can be opened manually giving access to the chamber 7 in order to allow the latter to be periodically replenished with the substances to be dispensed. Inside the storage chamber 7 a frame 9 is provided. The frame 9 is rotatably associated to the storage chamber 7 and it is preferably removable from said chamber 7 to allow periodical washing operations. The frame 9 comprises a toothed surface 10 whose teeth 11 interact with the thread 12 of the dosing screw 2 for rotating the frame 9 about its longitudinal axis. The frame 9 can preferably include a longitudinally extended sidewall 14 comprising one or more apertures 15. The storage chamber 7 is further provided with an agitating member 13 extending from a second end of the chamber 7 to the interior region of the chamber 7 itself and preferably along the longitudinal axis of the latter.

The agitating member 13 can be adapted to be rotated in a first direction and the frame 9 can be adapted to be rotated in a second direction opposite to said first direction. The agitating member 13 can be moved by dedicated motor means (not shown in FIG. 1) coupled with member 13 while the frame 9 is moved by the dosing screw 2. In this case an aperture is provided in the second end of the chamber 7, and eventually in the frame 9, to allow a mechanical connection between the agitating member 13 and the motor means. Alternatively, in order to simplify the structure of the dosing device, the agitating member 13 can be kept stationary while the frame 9 is adapted to be rotated. In these configurations the relative movement between the frame 9 and the agitating member 13 allows the dispensable substance contained in the storage chamber 7 to be agitated thereby avoiding clogs due, for example, to the effect of humidity and to a prolonged inactivity of the dosing device if said substance is a powder.

For allowing an efficient agitation of the dispensable substance inside the storage chamber 7, the agitating member 13 preferably comprises at least one arm 16 extending transversally in respect to its longitudinal axis. The arms 16 can be connected, for example two by two, by a further arm 17 extending parallel to the agitating member longitudinal axis. The apertures 15 preferably provided in the agitating member sidewall 14 help to agitate the dispensable substance in the peripheral region of the storage chamber 7.

In FIG. 2 the automatic dosing device in its open position is partly sectioned to show the dosing screw unit 25.

Referring also to FIG. 4 in which the dosing screw unit 25 is shown in an exploded view, it can be seen that a motor 1 is coupled with a clutch 18 mating a gear 19 for transferring a rotating movement to the dosing screw unit 25. Guiding means 20 is removably associated to the gear 19 by means of a pin 21 and are provided with a thread 22 engaging a conjugated thread 23 located on a portion of a cursor 24. Said cursor 24 is moved along the longitudinal axis of the dosing screw unit 25 and comprises a hollow cylinder through which the guiding means 20 can pass. The cursor 24 further comprises an elongated member 26 slidably coupled with a cavity 27 formed in the housing 3 thereby forming a guide that is useful to keep the cursor 24 axially aligned with the longitudinal axis of the dosing screw unit 25 during the movement of the cursor. In FIG. 5 the cursor 24 and its components are better shown. In order to ensure that the threads 22 and 23 engage each other, the cursor 24 and the guiding means 20 are reciprocally stressed by a spring 28. The spring 28 is preferably a helical spring having a first end resting against a shoulder 29 formed in the guiding means 20 and a second end resting against and within the cursor 24.

The cursor 24 is slidably coupled with a sealing member 30 comprising preferably a hollow cylindrical shape. In the embodiment shown in FIG. 2 and FIG. 4, the cursor 24 is arranged to slide within said sealing member 30, but it could be configured to slide on the outside of the sealing member 30. The sealing member 30 is preferably provided with a first tapered end 31 and with a gasket 32 for tightly closing the dispensable substance supply aperture 33 formed in the housing 3 and communicating with the storage chamber 7. The sealing member 30 further comprises a notch 35 extending on its lateral surface from a second end, opposite to the tapered end 31, toward the latter. The extension of the notch 35 between the ends of the sealing member 30 determines the range of the longitudinal movement of the cursor 24 in respect to the sealing member 30. Said movement is further limited at the second end of the sealing member 30 by means of a flange 34 which is fixed to the sealing member 30 thereby removably assembling the latter to the cursor 24.

The dosing screw 2 carrying the thread 12 can be removably associated to the guiding means 20 by a pin 35 but they can be equivalently formed in a single piece. In this case the cursor 24 and the sealing member 30 are formed each in two halves such that each of them can be mounted appropriately on the guiding means and the dosing screw formed in a single piece.

From the description above the guiding means 20, the cursor 24, the sealing member 30 and the dosing screw 2 are removably assembled so that the whole dosing screw unit 25 can be easily dismantled and washed when needed.

Referring now to FIGS. 2 and 3, it can be seen how the automatic dosing device works. In FIG. 2 the automatic dosing device is shown in its opened position. To reach the open position the motor 1 is activated such that the gear 19 transfers to the guiding means 20 a rotation that causes the thread 22 to slide on the conjugated thread 23 located on the cursor 24 thereby moving the cursor 24 with its elongated member 26 away for the housing 3. When the elongated member 26 interferes with the flange 34 associated to the sealing member 30, the cursor 24 moves the sealing member 30 away from the supply aperture 33 thus allowing the dispensable substance to be dosed.

When the sealing member 30 has completely opened the aperture 33 the thread 22 has slid almost for all its length along the conjugated thread 23 and the guiding means 20 presses the spring 28 against the cursor 24. This action exerted by the spring 28 is useful in the following closing operation when the thread 22 of the guiding means 20 has to engage again the conjugated thread 23.

The motor 1 is turned off after a certain amount of time since the aperture 33 has been completely opened. In said amount of time the dosing screw 2 rotates causing the dispensable substance to leave the storage chamber 7 by means of the thread 12.

In all its working steps, the motor 1 is operated for a controlled and predetermined period of time. A time counter (not shown in the drawings) starts counting when the motor 1 is operated and turns off the motor when it has reached a predetermined value which has been set according, for example, to the quantity of dispensable substance that must be dosed.

When the desired quantity of substance has been dosed, the sealing member 30 is driven toward the aperture 33 for closing it. The motor 1 is therefore operated for causing the gear 19 to transfer to the guiding means 20 a rotation that causes the thread 22 to slide on the conjugated thread 23 located on the cursor 24 thereby moving the cursor 24 with its elongated member 26 towards the housing 3.

The movement of the cursor 24 towards the aperture 33 causes the sealing member 30 to move in the same direction. This is made possible thanks to the provision of overrunning absorbing means 36 that are configured to be operable for preventing a force acting on the cursor 24 and having an intensity exceeding a predetermined value to be transferred from the cursor 24 to the sealing member 30. When said force has an intensity below the predetermined set value, that is during the ordinary working conditions, the cursor 24 can move the sealing member 30 towards the aperture 33. Said overrunning absorbing means 36 are preferably interposed between the cursor 24 and the sealing member 30 for reducing the overall dimensions of the dosing device, but they can be located in any advantageous position provided that they are adapted to prevent a force exceeding a set value to be transferred from the cursor 24 to the sealing member 30.

In the preferred way to carry out the invention the overrunning absorbing means 36 are in the form of a spring 37, but other means providing a suitable resiliency can be used equivalently. In case of the spring 37, the predetermined intensity of the force beyond which the spring 37 intervenes is fixed by the resistance of the spring 37 itself.

In ordinary working conditions, during the closing operation the cursor 24 causes the sealing member 30 to move towards the aperture 33 and when the tapered end 31 and the gasket 32 engage the aperture 33 the force acting on the cursor 24 exceeds the prefixed intensity and the overrunning absorbing means 36 intervene to avoid damages to the sealing member 30. A similar intervention can occur both if the sealing member 30, approaching the aperture 33, interferes with a block of clogged material both if the motor 1 overruns stressing the cursor 24, for example, for a sudden acceleration. Therefore the overrunning absorbing means can intervene independently of the sealing member position.

In FIG. 3 it is shown the automatic dosing device in its closed position. The spring 37, acting as an overrunning absorbing means 36, is compressed and the elongated member 26 has reached approximately its most advanced position towards the housing 3. In addition, the thread 22 of the guiding means 20 has almost disengaged the conjugated thread 23 of the cursor 24. The most advanced position, in which the elongated member 26 interferes with the edge of the notch 35, is reached intermittently in the last part of the closing operation when the guiding means 20 continues rotating and its thread 22 intermittently engages and disengages the conjugated thread 23. Thanks to this movement of the cursor 24, since the spring 37 has not completed its compression, a reciprocating movement is transferred to the sealing member 30. In this way the aperture 33 is gently cleaned from the possible presence of clogs.

Conclusively, it can therefore be stated that the present invention has an improved reliability because the integrity of the sealing member 30 and of the components of the dosing screw unit 25 is safeguarded by the overrunning absorbing means 36. In this way the automatic dosing device of the present invention can be advantageously used for dispensing many kinds of substances both in a solid state both in a liquid state.

Similarly the present invention provides means for avoiding the risk of damages to the dosing screw unit 25 reducing dramatically the possibility of clogs formation within the storage chamber 7 and in the region of the dispensable substance supply aperture 33.

As the present invention may be embodied in several forms without departing from the spirit or essential characteristics thereof, it should also be understood that the above-described embodiment is not limited by any of the details of the foregoing description, but rather should be construed broadly within its spirit and scope as defined in the appended claims, and therefore all changes and modifications that fall within the meets and bounds of the claims, or equivalence of such meets and bounds are therefore intended to be embraced by the appended claims.

The invention claimed is:

1. An automatic dosing device comprising:
a storage chamber (7) for storing dispensable material,
a dosing screw (2) housed in a housing (3),
guiding means (20),
a movable cursor (24) adapted to move a sealing member (30) which is adapted to tightly close a dispensable substance supply aperture (33) that is formed in the housing (3) and that is in communication with the storage chamber (7), and
overrunning absorbing means (36) configured to be operable for preventing a force acting on the cursor (24) and exceeding a predetermined intensity to be transferred to the sealing member (30) independently of the sealing member position, wherein said cursor (24) and said sealing member (30) are slidably coupled.

2. An automatic dosing device according to claim 1 wherein said overrunning absorbing means (36) are interposed between the cursor (24) and the sealing member (30).

3. An automatic dosing device according to claim 1 or 2 wherein said overrunning absorbing means (36) are in the form of a spring (37).

4. An automatic dosing device according to claim 1 wherein said cursor (24) is operatively associated to said guiding means (20).

5. An automatic dosing device comprising:
a dosing screw (2),
guiding means (20),
a cursor (24) operatively associated to said guiding means (20),
a movable sealing member (30), and
overrunning absorbing means (36) configured to be operable for preventing a force acting on the cursor (24) and exceeding a predetermined intensity to be transferred to the sealing member (30) independently of the sealing member position, wherein said cursor (24) and said guiding means (20) are reciprocally stressed by a spring (28).

6. An automatic dosing device comprising:
a dosing screw (2),
guiding means (20),
a cursor (24),
a movable sealing member (30), and
overrunning absorbing means (36) configured to be operable for preventing a force acting on the cursor (24) and exceeding a predetermined intensity to be transferred to the sealing member (30) independently of the sealing member position, wherein said guiding means (20) comprises a thread (22) adapted to engage a conjugated thread (23) provided in the cursor (24).

7. An automatic dosing device according to claim 1 wherein said guiding means (20), said cursor (24), said sealing member (30) and said dosing screw (2) are removably assembled.

8. An automatic dosing device according to claim 1 wherein said guiding means (20) and said dosing screw (2) are a single piece.

9. An automatic dosing device according to claim 8 wherein said cursor (24) and said sealing member (30) are formed each by two halves joined together.

10. An automatic dosing device according to claim 1, wherein said storage chamber (7) is provided with a frame (9) and an agitating member (13).

11. An automatic dosing device according to claim 10 wherein said agitating member (13) extends along the longitudinal axis of said storage chamber (7).

12. An automatic dosing device comprising:
a dosing screw (2),
guiding means (20),
a movable sealing member (30),
a cursor (24) adapted to move the sealing member (30),
a storage chamber (7) for storing dispensable material, said chamber (7) being provided with a frame (9) and an agitating member (13), and
overrunning absorbing means (36) configured to be operable for preventing a force acting on the cursor (24) and exceeding a predetermined intensity to be transferred to the sealing member (30) independently of the sealing member position, wherein said agitating member (13) is adapted to be rotated in a first direction and said frame (9) is adapted to be rotated in a second direction opposite to said first direction.

13. An automatic dosing device comprising:
a dosing screw (2),
guiding means (20),
a movable sealing member (30), a cursor (24) adapted to move the sealing member (30), a storage chamber (7) for storing dispensable material, said chamber (7) being provided with a frame (9) and an agitating member (13), and overrunning absorbing means (36) configured to be operable for preventing a force acting on the cursor (24) and exceeding a predetermined intensity to be transferred to the sealing member (30) independently of the sealing member position, wherein said agitating member (13) is stationary and said frame (9) is adapted to be rotated.

14. An automatic dosing device according to claim 10 wherein said agitating member (13) comprises at least one arm (16) extending transversely in respect to the longitudinal axis of said agitating member (13).

* * * * *